US010683022B2

(12) United States Patent
Boichot et al.

(10) Patent No.: US 10,683,022 B2
(45) Date of Patent: Jun. 16, 2020

(54) METHOD FOR THE MAINTENANCE OF A GROUND-LEVEL POWER SUPPLY DEVICE FOR A TRAM-LIKE VEHICLE

(71) Applicant: ALSTOM Transport Technologies, Saint-Ouen (FR)

(72) Inventors: Philippe Boichot, Dijon (FR); Ouadie Hmad, Montereau-Fault-Yonne (FR); Frederic Hiely, Entraigues (FR); Stephan Audibert, Pourrieres (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 150 days.

(21) Appl. No.: 15/881,429

(22) Filed: Jan. 26, 2018

(65) Prior Publication Data

US 2018/0215401 A1    Aug. 2, 2018

(30) Foreign Application Priority Data

Jan. 27, 2017   (FR) ...................................... 17 50671

(51) Int. Cl.
*B61L 23/04*    (2006.01)
*B60L 5/42*    (2006.01)
(Continued)

(52) U.S. Cl.
CPC .................. *B61L 23/04* (2013.01); *B60L 5/40* (2013.01); *B60L 5/42* (2013.01); *B60M 1/04* (2013.01);
(Continued)

(58) Field of Classification Search
CPC ... B60L 5/40; B60L 5/42; B60M 1/04; B60M 1/36; B61L 25/025
(Continued)

(56) References Cited

U.S. PATENT DOCUMENTS 6,382,378 B1 *  5/2002  Cornic ..................... B60M 1/10
                                                        191/14
8,544,622 B2 * 10/2013  Vollenwyder ........... B60L 5/005
                                                        191/10
(Continued)

FOREIGN PATENT DOCUMENTS

DE         133422 A1    1/1979
EP        0962353 A1   12/1999
(Continued)

OTHER PUBLICATIONS

Atsuhiro Takahashi et al.: "Overhead Contact Line Monitoring and Prediction of Contact Wire Localized Wear Points". JR East Technical Review No. 20—Summer 2014, Jan. 1, 2014, pp. 22-25, XP055319971.

(Continued)

*Primary Examiner* — Thomas G Black
*Assistant Examiner* — Luke Huynh
(74) *Attorney, Agent, or Firm* — Knobbe, Martens, Olson & Bear, LLP

(57) ABSTRACT

A method is for maintenance of a ground-level power supply for a transport vehicle. The device includes: a power supply rail, a detector of spatial coordinates of a vehicle; and a power supply shoe. The device and the shoe equip the same vehicle. The supply shoe includes a vibration sensor. The method includes measuring vibrations of the shoe and simultaneously detecting spatial coordinates of the vehicle during the movement of the vehicle along the rail, followed by comparing measured vibrations of the shoe with a threshold value, and determining spatial coordinates corresponding to vibrations above the threshold value.

10 Claims, 3 Drawing Sheets

(51) Int. Cl.
  *B60M 1/04* (2006.01)
  *B60M 1/10* (2006.01)
  *B60M 1/36* (2006.01)
  *B60L 5/40* (2006.01)
  *B61L 25/02* (2006.01)
  *B61L 27/00* (2006.01)

(52) U.S. Cl.
  CPC ............... *B60M 1/10* (2013.01); *B60M 1/36* (2013.01); *B61L 25/025* (2013.01); *B60L 2200/26* (2013.01); *B60L 2240/62* (2013.01); *B61L 27/0094* (2013.01)

(58) Field of Classification Search
  USPC .......................................................... 701/19
  See application file for complete search history.

(56) References Cited

U.S. PATENT DOCUMENTS

| | | | | |
|---|---|---|---|---|
| 8,655,517 | B2 * | 2/2014 | Brand | B61L 15/0036 246/28 R |
| 8,825,239 | B2 * | 9/2014 | Cooper | B61L 15/0036 188/153 R |
| 8,827,058 | B2 * | 9/2014 | Vollenwyder | B60L 5/005 191/10 |
| 9,026,283 | B2 * | 5/2015 | Baldwin | B61L 29/282 701/19 |
| 2012/0150370 | A1 * | 6/2012 | Oldknow | B61K 9/08 701/19 |

FOREIGN PATENT DOCUMENTS

| | | |
|---|---|---|
| EP | 1043187 A1 | 10/2000 |
| EP | 1352777 A1 | 10/2003 |
| JP | 2000-079839 A | 3/2000 |
| JP | 2007-288893 A | 11/2007 |
| JP | 2008-285118 A | 11/2008 |
| WO | 2010/043951 A2 | 4/2010 |

OTHER PUBLICATIONS

French Search Report for FR 1750671 dated Oct. 3, 2017 in 3 pages.

* cited by examiner

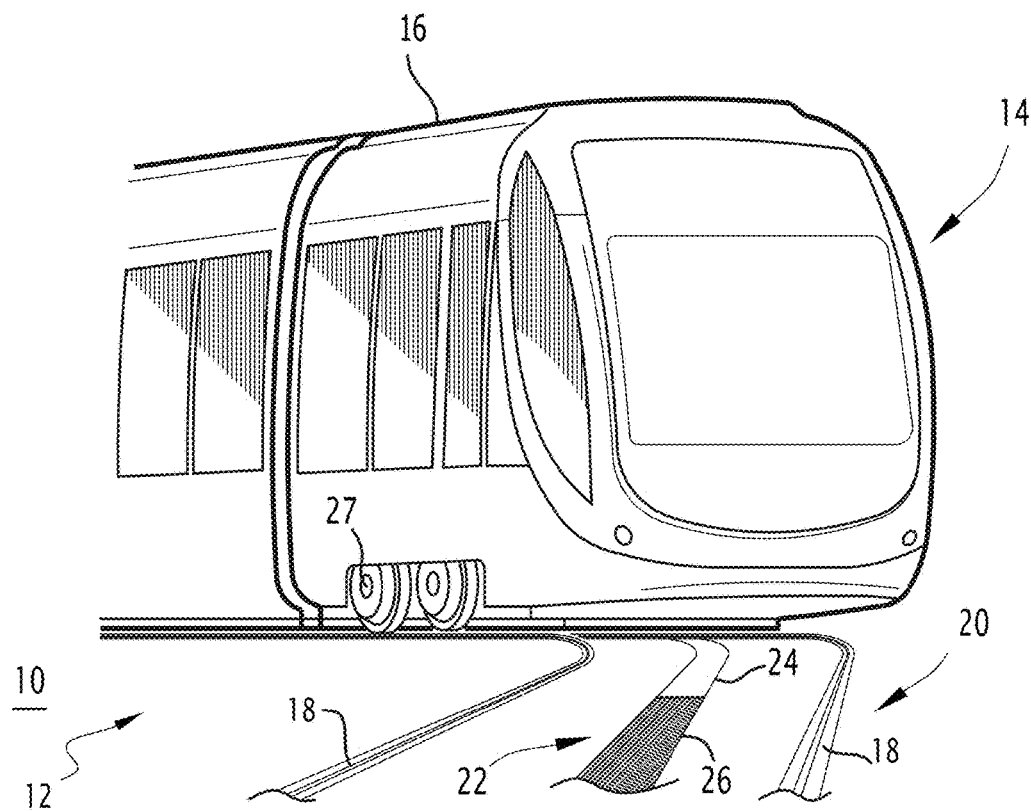
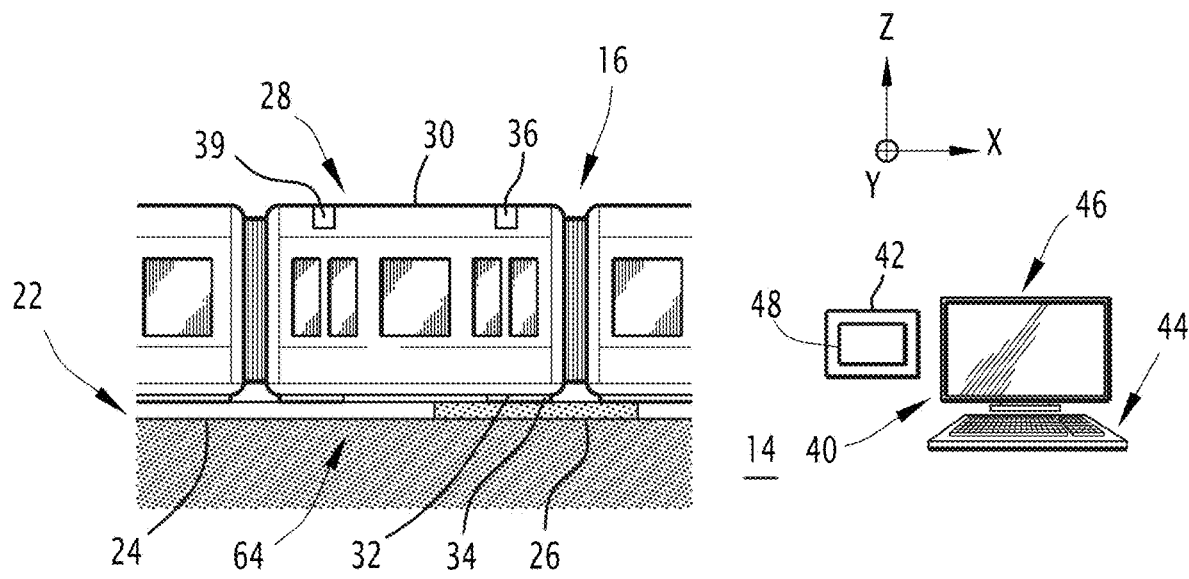

METHOD FOR THE MAINTENANCE OF A GROUND-LEVEL POWER SUPPLY DEVICE FOR A TRAM-LIKE VEHICLE

The invention relates to a method for the maintenance of a ground-level power supply device for a transport vehicle, said device including: a power supply rail; a device for detecting spatial coordinates of a vehicle; and a power supply shoe; said detection device and said supply shoe equipping a same transport vehicle, the supply shoe being able to rub against the power supply rail during a movement of said vehicle along said rail.

Ground-level power supply, or GLPS, is a method of supplying electricity for trams. A ground-level power supply device is for example described in document EP 1,043,187. The power supply rail is divided into electrically conductive segments separated by insulating segments. The conductive segments are supplied only when they are completely covered by the tram, thus preventing any risk of electrocution for other users (pedestrians, bicycles, motorcycles).

The structures of the conductive segments and the insulating segments cause different wear over time and as a function of stresses. This phenomenon is accentuated by the passage of vehicles, such as trucks or buses, over the power supply rails.

These differences in wear cause misalignments to appear between the segments, which generate shocks absorbed by the supply shoes. These shocks lead to deterioration of said shoes, as well as the power supply rail.

It is therefore desirable to detect these misalignments as early as possible after they appear, so as to be able to resolve them.

To that end, the invention relates to a maintenance method of the aforementioned type, wherein the supply shoe includes a sensor detecting vibrations of said shoe in contact with the supply rail; and the method includes the following steps: moving the transport vehicle along the rail; during said movement, measuring vibrations of the supply shoe and simultaneously detecting spatial coordinates of the vehicle; and comparing the measured vibrations of the supply shoe with a threshold value, and determining spatial coordinates corresponding to vibrations above said threshold value.

According to other advantageous aspects of the invention, the method includes one or more of the following features, considered alone or according to all technically possible combinations:
- the method comprises, between the steps for measuring vibrations and performing the comparison with the threshold value, a step for segmenting the measured vibrations;
- the step for determining the spatial coordinates corresponding to vibrations above the threshold value comprises a graphic representation of the power supply rail, on which said spatial coordinates are indicated by a visual marker.

The invention further relates to a ground-level power supply device for a transport vehicle, said device including: a power supply rail; a device for detecting spatial coordinates of a vehicle; and a supply shoe of a vehicle, able to rub against the power supply rail during a movement of said vehicle along said rail; said detection device and said supply shoe being intended to equip said same vehicle. The supply shoe includes a sensor detecting vibrations of said shoe in contact with the supply rail; and the power supply device includes means for implementing a method as described above.

According to other aspects of the invention, the device includes one or more of the following features, considered alone or according to any technically possible combination(s):
- the vibration sensor of the supply shoe includes an accelerometer;
- the supply shoe comprises at least two accelerometers, each being situated close to one end of the shoe along a movement direction of the vehicle;
- the supply shoe comprises a soleplate and at least one accelerometer situated in the middle of the soleplate along the movement direction of the vehicle;
- the supply shoe comprises a soleplate and a lever, the lever comprising a device for assessing strains and/or vertical and transverse forces, said assessment device comprising at least one accelerometer and/or at least one strain gauge;
- the power supply rail includes electrically conductive segments and electrically insulating segments, alternating and substantially aligned.

The invention further relates to an installation for a transport vehicle, including: a power supply device as described above; a transport vehicle, equipped with the detection device and the supply shoe of said power supply device; and two travel rails situated on either side of the power supply rail, the transport vehicle being provided with means for moving on said travel rails.

The invention will be better understood upon reading the following description, provided solely as a non-limiting example and done in reference to the drawings, in which:

FIGS. 1 and 2 are partial views of an installation for a transport vehicle, including a power supply device according to one embodiment of the invention;

Figure 3:
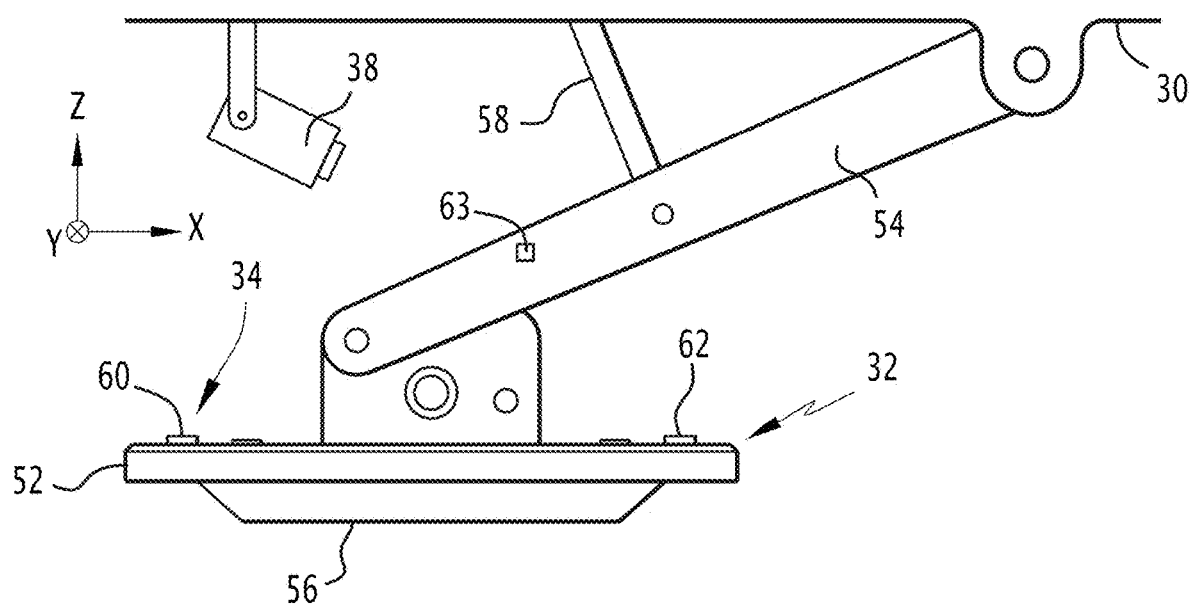
FIG. 3 is a detail view of the transport vehicle of the installation of FIG. 1.

FIG. 1 partially shows an installation 10 for a transport vehicle of the tram type.

The installation 10 includes a railway circuit 12 and a ground-level power supply device 14. The installation 10 further includes a transport vehicle 16 of the tram type, powered by said power supply device 14. The railway circuit 12 includes two substantially parallel travel rails 18. The rails 18 are in particular embedded in a roadway 20 over at least part of the railway circuit 12.

The power supply device 14 includes a power supply rail 22, extending along the railway circuit 12 and positioned between the travel rails 18.

The power supply rail 22 is divided into electrically conductive segments 24 separated by insulating segments 26. The power supply device 14 further includes a power line (not shown) buried in the roadway 20 parallel to the power supply rail 22 and supplied with power at all times. The power supply device 14 further includes switching means (not shown) for the selective connection of the conductive segments 24 when the vehicle 16 is detected above these segments.

The vehicle 16 includes means for traveling on the travel rails 18. Said means are preferably wheels 27. FIG. 2 shows an orthonormal base (X, Y, Z) associated with the vehicle 16. The direction X represents a horizontal movement direction of the vehicle 16, the direction Y represents a transverse direction and the direction Z represents the vertical.

The vehicle 16 preferably includes several cars 28, as shown in FIG. 2. Each car in particular includes a body 30.

The power supply device 14 includes at least one, and preferably several supply shoes 32. The supply shoes 32 are fastened in the lower part of the body 30 of at least one car 28. Each supply shoe 32 is able to transmit electrical energy to the vehicle 16 from the supply rail 22, by rubbing against said rail during a movement of the vehicle 16 on the railway circuit 12.

In the context of the present invention, at least one supply shoe 32 of the vehicle 16 includes an electronic sensor 34 detecting vibrations of said shoe in contact with the supply rail 22.

Furthermore, the power supply device 14 includes an electronic detector 36 of the spatial coordinates of the vehicle 16. Said spatial coordinates are for example the longitude and the latitude of the detector 36. Said detector 36, in particular connected to a GPS-type system, is preferably situated on the car 28 bearing the shoe 32 provided with the vibration sensor 34.

Preferably, the power supply device 14 further includes at least one camera 38 (FIG. 3), preferably infrared, fastened in the lower part of the body 30 of the car 28. The camera 38 makes it possible to be the position of the shoe 32 relative to the supply rail 22 or the body of the car 28.

Preferably, the power supply device 14 further includes at least one speed sensor 39, situated on the vehicle 16, able to measure the movement speed of said vehicle.

The power supply device 14 further includes a logic controller 40, such as a computer. The logic controller 40 comprises a processor 42, a man-machine interface 44 such as a keyboard, and a display unit 46 such as a monitor. The processor 42 stores a program 48.

The logic controller 40 is provided with communication means, for example by radio waves, with the vibration sensor 34 and the spatial coordinate detector 36. The logic controller 40 is preferably situated in a location outside the vehicle 16. Alternatively, the logic controller 40 is situated on board said vehicle 16.

Preferably, the logic controller 40 is further provided with means for communicating with the camera 38 and the speed sensor 39.

FIG. 3 shows a detail view of the supply shoe 32 including a vibration sensor 34.

The supply shoe 32 for example includes a soleplate 52 and a lever 54. The soleplate 52 includes a lower surface 56 in contact with the supply rail 22. The lever 54 includes two ends, respectively articulated to the soleplate 52 and the body 30 of the car 28. According to one embodiment, the supply shoe 32 further includes an actuator 58 connected to the lever 54 and making it possible to move the soleplate 52 vertically, so as to move it away from or closer to the supply rail 22.

According to one preferred embodiment, the vibration sensor 34 includes at least one accelerometer 60, 62.

More specifically, in the embodiment of FIG. 3, the vibration sensor 34 is made up of two accelerometers 60 and 62. Each of said accelerometers is situated close to one end of the soleplate 52 in the direction X.

Alternatively, the vibration sensor 34 includes an accelerometer in the middle of the soleplate 52 along the direction X.

Each accelerometer 60, 62 is able to measure vibrations of the soleplate 52, in particular in the directions X, Y and Z.

Advantageously, the lever 54 comprises a device 63 for assessing strains and/or vertical and transverse forces. Said assessment device 63 for example comprises at least one accelerometer and/or at least one strain gauge. The lever 54 is for example equipped with the first strain gauge in an upper part and a second strain gauge in a lower part. The assessment device 63 is provided with means for communicating with the logic controller 40.

Figure 4:
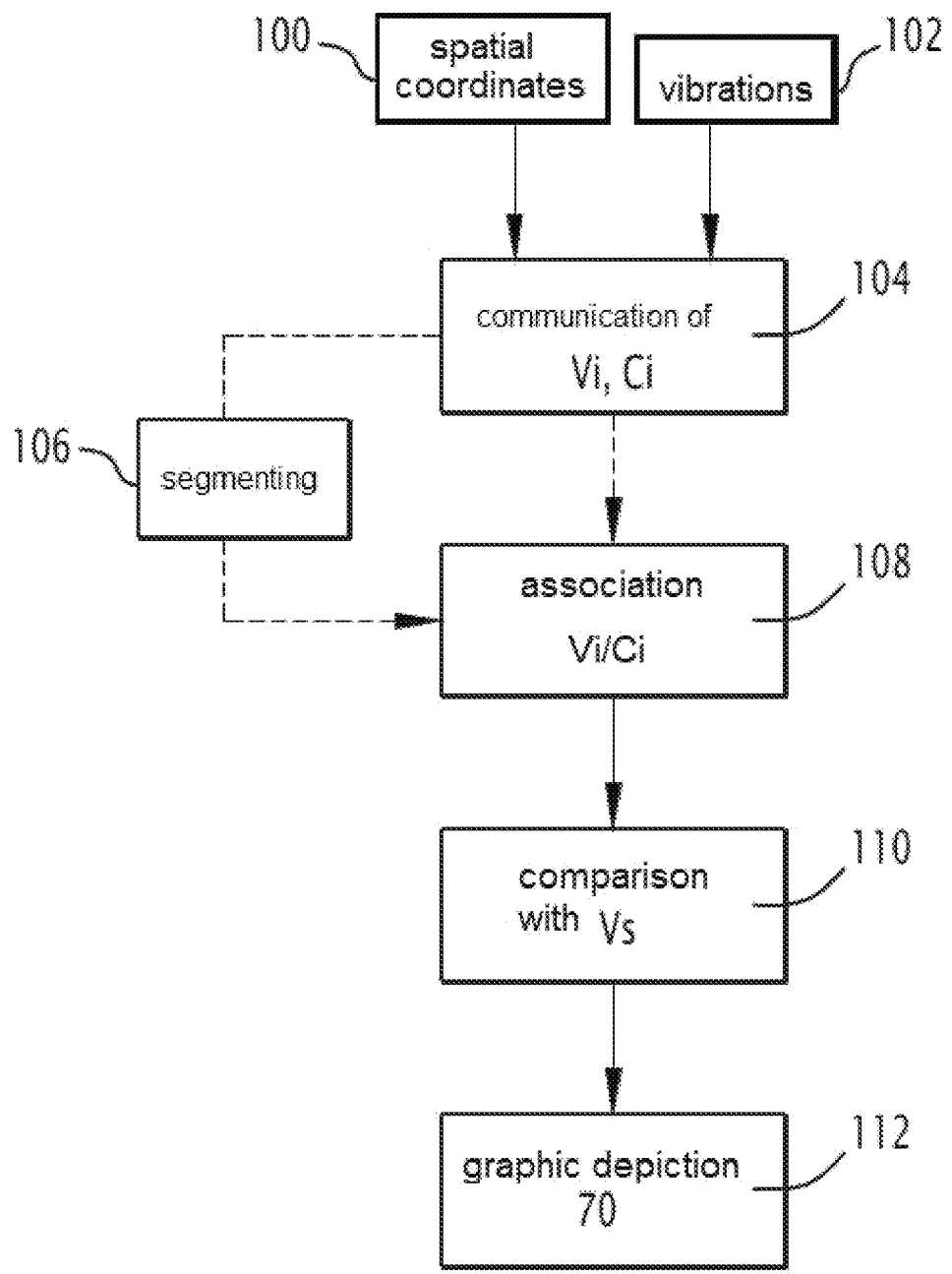
FIG. 4 shows a flowchart corresponding to a maintenance method for the power supply device of FIGS. 1 and 2, according to one body of the invention.

A method for maintenance of the installation 10 and the power supply device 14 will now be described. Said method is shown schematically by a flowchart in FIG. 4.

First, the vehicle 16 moves on the railway circuit 12. The detector 36 determines the spatial coordinates of said vehicle 16 at several successive moments $t_i$ during said movement (step 100). At the same time, the sensor 34 measures the vibrations of the supply shoe 32 (step 102).

Preferably, the speed sensor 39 simultaneously measures the movement speed of the vehicle 16.

Preferably, the at least one camera 38 records a video of the movement of the shoe 32 relative to the body 30 or the supply rail 22.

The vibration level measured by the sensor 34 depends in particular on the state of the supply rail 22. For example, if said rail is misaligned at a junction 64 (FIG. 2) between a conductive segment 24 and an insulating segment 26, the shoe 32 experiences a shock when it comes into contact with said junction. This shock is reflected by a high measured vibration level.

The information acquired by the sensor 34 and the detector 36, and optionally by the speed sensor 39 and the at least one camera 38, respectively the measured vibration values $V_i$, the spatial coordinates $C_i$ and optionally the speed of the vehicle and the video, is communicated to the logic controller 40 (step 104).

If the sensor 34 is formed from several accelerometers 60, 62, the value $V_i$ corresponds to a vector whereof each column corresponds to the measurements of said accelerometers 60 and 62. Subsequently, these measurements are for example averaged.

According to one preferred embodiment, in order to eliminate the noise and facilitate the analysis of information, the method preferably comprises a step in which the measured vibration values $V_i$ next undergo a segmenting step (step 106). For example, a graphic depiction of the function [measurement moment $(t_i)$/measured vibration $(V_i)$] is converted by the logic controller 40 into segments separated by inflection points, according to a segmenting model. Each value $V_i$ is then replaced by a modified value $V'_i$. A method involving a segmenting step is for example described in document WO2010/043951.

The program 48 next associates each vibration value $V_i$ or $V'_i$ with the corresponding spatial coordinates $C_i$, in particular acquired during a same moment $t_i$ (step 108).

Advantageously, a kilometric point of the vehicle 16 on the track is calculated from the speed of said vehicle. The kilometric point is the number of kilometers traveled by the vehicle on the track from a given reference point. The spatial coordinates $C_1$ are advantageously adjusted using the kilometric point: the spatial coordinates $C_1$ for example make it possible to generally determine the journey of the vehicle, and the kilometric point makes it possible to determine the precise location of said vehicle on the track corresponding to the journey. Each value $C_i$ is then replaced by a modified value $C'_i$.

The program 48 compares the vibration values $V_i$ or $V'_i$ with a threshold value $V_S$ stored in the program 48. Said vibration values $V_i$ or $V'_i$ are then classified in two groups: the "normal values" and the "abnormal values", respectively lower and higher than the threshold value $V_S$ (step 110).

Figure 5:
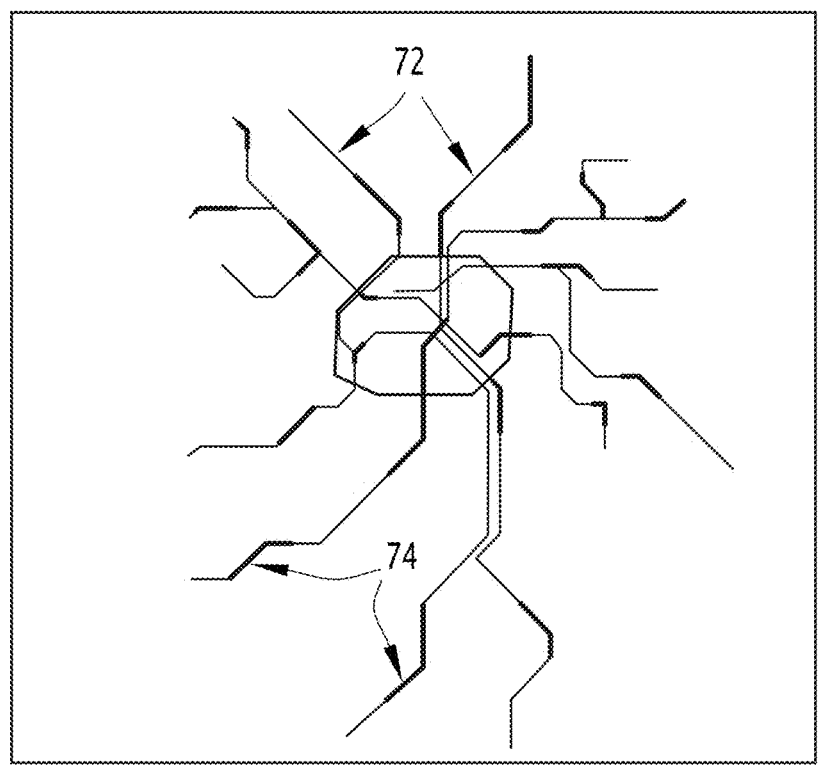
FIG. 5 is a graphic illustration corresponding to a step of the maintenance method of FIG. 4.

The program 48 thus determines the spatial coordinates $C_i$ or $C'_i$ corresponding to "abnormal values" of the vibration (step 112). Preferably, this determination step comprises developing a graphic depiction of the map type 70 of the railway circuit 12, as shown in FIG. 5. In this example, the railway circuit 12 corresponds to the tram network of a city.

The map 70 is for example displayed on the monitor 46 of the computer 40. The map 70 shows, in a visually different manner, the portions of the railway circuit 12 corresponding to the "normal values" and the "abnormal values" of the vibration. For example, the "normal values" portions 72 and the "abnormal values" portions 74 are indicated by different colors.

The location of the abnormal vibration zones on a map of the railway circuit 12 then makes it possible to send an operating team quickly to the affected locations, in particular to correct the alignment of the segments at the junctions 64.

According to one alternative embodiment, the program 48 stores several threshold values, for example two threshold values $V_{S1}$ and $V_{S2}$ with $V_{S1}<V_{S2}$. This alternative makes it possible to classify the vibration values $V_i$ or $V'_i$ in three groups, for example "normal values", "priority 1 abnormal values" and "priority 2 abnormal values". This alternative makes it possible to rank the priority levels of maintenance operations on the railway circuit 12.

Advantageously, in parallel, the logic controller 40 analyzes the video recorded by the camera 38. The logic controller 40 for example detects any vertical jump of the shoe or any displacement of the shoe in the transverse direction Y.

This in particular makes it possible to correlate any abnormal vibration of the shoe detected by the vibration sensor 34, 60, 62 with a jump or displacement of the shoe.

Advantageously, in parallel, the logic controller 40 analyzes the strains and/or the vertical and transverse forces of the shoe 32, communicated by the assessment device 63. The geometry of the track may have hard spots, in particular in the switching passage, which leads to the generation of significant forces on the lever 54 of the shoe, in particular if the latter is partially blocked. The assessment device 63 in particular makes it possible to detect a defect in the lever 54 before the latter breaks and/or to understand the cause of the break if applicable.

The method described above is advantageously carried out in the test phase of the railway circuit 12 to detect installation problems of the power supply device 14. The method is also carried out in the usage phase, so as to deploy maintenance teams optimally on the network. Advantageously, several tram rafts typically traveling on the railway circuit 12 are equipped with sensors 34, 36, like the vehicle 16 described above. Thus, the state of the network is updated in real-time.

What is claimed is:

1. A method for the maintenance of a ground-level power supply for a transport vehicle, said power supply including:
   a ground-level power supply rail;
   a spatial coordinate detector configured to detect spatial coordinates of a vehicle; and
   a supply shoe;
   said detector and said supply shoe equipping a same transport vehicle,
   the supply shoe being able to rub against the supply rail during a movement of said vehicle along said rail;
   wherein the supply shoe includes a sensor detecting vibrations of said shoe in contact with the supply rail; and
   wherein the method includes the following steps:
   moving the transport vehicle along the rail;
   during said movement, measuring vibrations of the supply shoe and simultaneously detecting spatial coordinates of the vehicle; then
   comparing measured vibrations of the supply shoe with a threshold value, and
   determining spatial coordinates corresponding to vibrations above said threshold value.

2. The maintenance method according to claim 1, comprising, between the steps for measuring vibrations and performing the comparison with the threshold value, a step for segmenting the measured vibrations.

3. The maintenance method according to claim 1, wherein the step for determining the spatial coordinates corresponding to vibrations above the threshold value comprises a graphic representation of the power supply rail, on which said spatial coordinates are indicated by a visual marker.

4. A ground-level power supply for a transport vehicle, said power supply including:
   a ground-level power supply rail;
   a spatial coordinate detector configured to detect spatial coordinates of a vehicle; and
   a supply shoe of a vehicle, able to rub against the supply rail during a movement of said vehicle along said rail;
   said detector and said supply shoe being intended to equip said same vehicle,
   wherein the supply shoe includes a sensor detecting vibrations of said shoe in contact with the supply rail; and
   wherein the power supply includes a logic controller, said logic controller storing a program for implementing a method according to claim 1.

5. The power supply according to claim 4, wherein the vibration sensor of the supply shoe includes an accelerometer.

6. The power supply according to claim 5, wherein the supply shoe comprises at least two accelerometers, each being situated close to one end of the shoe along a movement direction of the vehicle.

7. The power supply according to claim 5, wherein the supply shoe comprises a soleplate and at least one accelerometer situated in the middle of the soleplate along the movement direction of the vehicle.

8. The power supply according to claim 5, wherein the supply shoe comprises a soleplate and a lever, the lever comprising a device for assessing strains or vertical and transverse forces, said assessment device comprising at least one accelerometer or at least one strain gauge.

9. The power supply according to claim 4, wherein the power supply rail includes electrically conductive segments and electrically insulating segments, alternating and substantially aligned.

10. An installation for a transport vehicle, including:
    a power supply according to claim 4;
    a transport vehicle, equipped with the detection device and the supply shoe of said power supply; and
    two travel rails situated on either side of the supply rail, the transport vehicle being provided with wheels for moving on said travel rails.

* * * * *